United States Patent Office

3,756,856
Patented Sept. 4, 1973

3,756,856
FLEXIBLE SEALING MATERIAL FOR ENERGY CONVERSION DEVICES
Gerald J. Tennenhouse, Oak Park, Mich., assignor to Ford Motor Company, Dearborn, Mich.
Filed Nov. 2, 1971, Ser. No. 194,909
Int. Cl. H01m *43/00*
U.S. Cl. 136—6 FS
7 Claims

ABSTRACT OF THE DISCLOSURE

Polycarborane siloxanes having about 1.5–2 silicone linkages per polymer unit perform effectively in sealing junctions and other internal elements of sodium-sulfur energy conversion devices. The sealing materials retain satisfactory properties at elevated temperatures exceeding 300° C. and can be placed in contact with both molten sodium and molten sulfur. Adding considerable amounts of carbon particles renders the sealing materials electrically conductive without depreciating significantly the corrosion resistance thereof to the reactants.

SUMMARY OF THE INVENTION

Recently developed sodium-sulfur energy conversion devices comprise an ionically conductive ceramic electrolyte located between an alkali metal reactant in one chamber and a sulfurous reactant in another chamber. Both the alkali metal reactant and the sulfurous reactant are molten at typical operating temperatures of about 300° C. Considerable difficulties have been encountered in manufacturing such devices primarily because of the corrosive nature of the reactants at operating temperature and differences in thermal expansion between the ceramic electrolyte and metals used to contain the reactants.

This invention provides flexible sealing materials resistant to attack by the reactants and the atmosphere at operating temperatures. These sealing materials also remain reasonably flexible despite numerous cycles from room temperature to operating temperature. The sealing materials consist essentially of a polycarborane siloxane having at least about 1–2 silicone linkages per repeating unit of the polymer.

Sealing materials of this invention perform effectively between the molten alkali metal reactant and the sulfurous reactant, between either of the reactants and the atmosphere, or as a protective seal coating of an element located exclusively in contact with one of the reactants. A polycarborane siloxane polymer (the term "polymer" is used herein to designate polymers, copolymers and interpolymers) containing an average of at least about 1.5 silicone linkages per repeating unit provides the best combination of useful life and workability. Various fillers such as carbon black, alumina, magnesia, and other metal oxides and ceramics can be added to strengthen and extend the polymers without affecting corrosion resistance. Such fillers also improve temperature properties, in some cases to temperatures exceeding 375° C. Significant strength improvements are provided by a minimum of about 10 weight percent filler.

Certain fillers not only strengthen and extend the resulting mixture but also improve electrical conductivity without affecting corrosion resistance. Adding at least about 45 weight percent of particulate carbon or graphite to the sealing material forms an electrically conductive composition that retains its resistance to the sulfurous reactant and is useful particularly as a coating for electrodes and other elements located in contact therewith.

Polycarborane siloxane polymers useful as the sealing materials of this invention are described in U.S. patents Heying et al. 3,388,090; 3,388,091, 3,388,092 and 3,388,-093 and Papetti et al. 3,463,801 and include alkyl, aryl and olefinic substituted polymers. The polymers are mixed with appropriate fillers and curing agents, applied to the desired locations in the energy conversion device, and cured in place by heating to a temperature of about 325° C. for 30 to 60 minutes. Crosslinking occurs during curing to produce thermoset properties. Polymers containing in excess of 2 silicone linkages per unit tend to become susceptible to corrosive attack by the molten sodium reactant. Polymers containing in excess of 2 silicone linkages per unit remain resistant to corrosive attack by the sulfurous reactant but exhibit decreasing temperature resistance.

DETAILED DESCRIPTION

Figure 1:
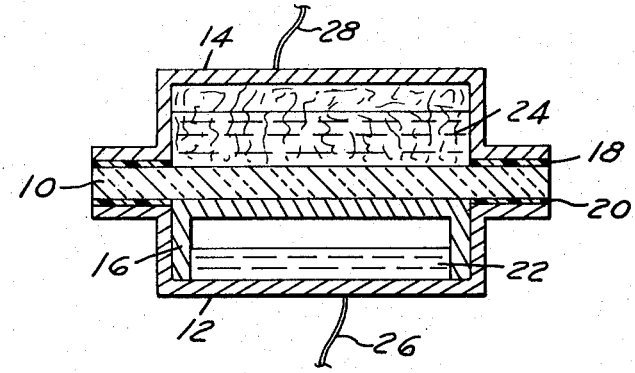
FIG. 1 is a sectioned elevation of a disc-shaped sodium-sulfur energy conversion device showing the application of sealing materials of this invention between the atmosphere and each of the reactants.

Referring primarily to FIG. 1, a disc-shaped plate 10 of an ionically conductive solid ceramic electrolyte is located between a cup-shaped lower container 12 and a cup-shaped upper container 14. Each of containers 12 and 14 has a flange surrounding its opening. A cup-shaped member 16 made of porous metal has its base bearing against the lower surface of plate 10 and its sides depending downwardly therefrom.

A ring-shaped polycarborane siloxane seal member 18 is located at the junction of flange of upper container 14 with the upper surface of plate 10. A similar ring-shaped seal member 20 is located between the junction of flange of lower container 12 with the lower surface of plate 10. Container 12 is filled to a predetermined level with molten sodium 22 and container 14 is filled to a predetermined level with molten sulfur or sodium polysulfide 24. Porous metal member 16 utilizes capillary action to draw the molten sodium into contact with the lower surface of plate 10. Graphite felt 32 is located in container 14 in contact with the inner surface of the container.

Seal members 18 and 20 are made of a polycarborane siloxane copolymer averaging approximately 1.6 silicone linkages (—Si—O—) per repeating unit. The copolymer is prepared by blending appropriate proportions of a polycarborane siloxane polymer containing 1.5 silicone linkages per repeating unit with a polycarborane siloxane polymer containing 2 silicone linkages per repeating unit and a small amount of peroxide curing agent. Each of the polymers contains olefin substitutions. The mixture is pressed between flange 15 and the upper surface of plate 10 and is cured in place by heating to about 325° C. for 30–60 minutes. Crosslinking and copolymerization occur during curing. Up to about 25 weight percent particulate carbon or other fillers can be added to the polymer mixture as desired. The fillers typically are about 200 mesh but widely varying particle sizes can be used.

Containers 12 and 14 typically are made of stainless steel and the containers are attached to each other by some electrically insulative means (not shown) such as glass. Electrical leads 26 and 28 are connected to containers 12 and 14 respectively and to an exterior electrical circuit (not shown).

Figure 2:
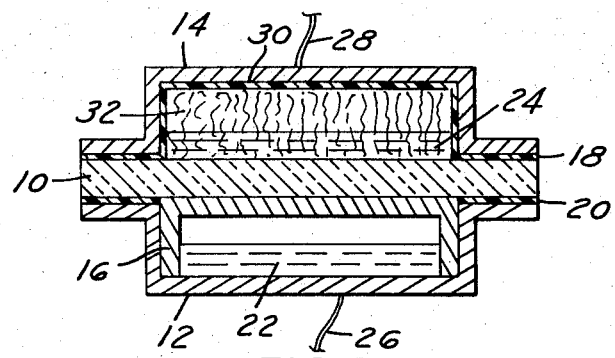
FIG. 2 is a sectioned elevation of a similar device in which a seal coating of the material of this invention is applied to the entire interior of the housing for the sulfurous reactant.

The battery construction shown in FIG. 2 is similar to that of FIG. 1 except that a coating 30 made of a polycarborane siloxane seal material is applied to the entire inner surface of upper container 14. Coating 30 is made of a polycarborane siloxane polymer or copolymer having an average of 2 silicon linkages per repeating unit mixed with at least 45 weight percent of particulate carbon. Graphite felt 32 is located in the interior of container 14 and is in electrical contact with the inner surface of coating 30.

Coating 30 conducts electrons from lead 28 and container 14 to and from felt 32 but nevertheless retains sealing properties to protect the metal of container 14 from the corrosive nature of the sulfurous reactant within the container. Electrical measurements of a similar coating containing 60 weight percent graphite (200 mesh) showed an electrical resistivity of less than one ohm-cm. Numerous other metals thus can be used to make container 14 without affecting significantly the overall battery performance. The coatings can be applied by dipping, brushing, spraying, etc., to internal electrodes and electrode components.

Figure 3:
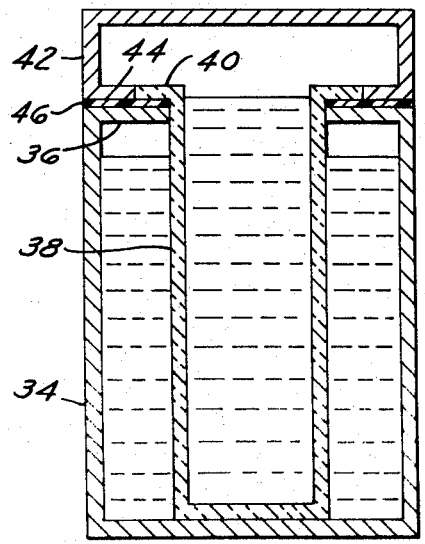
FIG. 3 is a sectioned elevation showing a cylindrical construction of an energy conversion device in which the sealing material contacts molten sodium, molten sulfur and the atmosphere.

Turning to FIG. 3, a cylindrical container 34 has an inwardly extending flange 36 at its open end. A cylindrical solid ceramic electrolyte 38 fits into the opening left by flange 36. Electrolyte 38 has an outwarlly extending flange 40 that is located a short distance above flange 36 and subtends approximately the inner half of flange 36. A cylindrical cover 42 having an outer diameter equal to that of container 34 has an inwardly extending flange 44 that rests on top of the remaining portion of flange 36.

A layer 46 of polycarborane siloxane is located on the top surface of flange 36 so it is between flange 36 and flanges 40 and 44. The polycarborane siloxane in layer 46 comprises an average of about .6 silicone linkages per unit and contains about 20 percent particulate carbon. Sulfourous reactant is located in container 34 and molten sodium is located in electrolyte 38. During operation, the level of the molten sodium can rise to fill at least partially the interior of cover 42. Layer 46 thus contacts molten sodium, molten sulfur reactant and the atmosphere.

Thus this invention provides a versatile, flexible sealing material for energy conversion devices containing alkali metal and sulfurous reactants. The sealing materials remain flexible and corrosion resistant throughout repeated operation cycles involving heating from room temperature to over 300° C.

What is claimed is:

1. In a battery having an ionically conductive member located between an alkali metal reactant in one chamber and a sulfurous reactant in another chamber, a sealing material capable of operating for extended time periods in contact with at least one of said reactants at elevated temperature, said sealing material consisting essentially of a polycarborane siloxane having at least about 1–2 silicone linkages per repeating unit of the polymer.

2. The battery of claim 1 in which the polymer contains at least about 1.5 silicone linkages per repeating unit of the polymer.

3. The battery of claim 2 in which the sulfurous reactant is molten sulfur, sodium polysulfide, or mixtures thereof and the sealing material forms a seal between the sulfurous reactant and the atmosphere, said sealing material being free of filler.

4. The battery of claim 1 in which the polymer contains between 1.5 and 2 silicone linkages per repeating unit of the polymer.

5. The battery of claim 4 in which the sealing material contains at least about 10 weight percent of particulate carbon.

6. The battery of claim 5 in which the alkali metal reactant is molten sodium and the sealing material forms a seal between the molten sodium and the sulfurous reactant.

7. The battery of claim 4 in which the sulfurous reactant is molten sulfur, sodium polysulfide or mixtures thereof and the sealing material contains at least about 45 weight percent of particulate carbon, said sealing material forming an electrically conductive seal coating in contact with said sulfurous reactant.

References Cited
UNITED STATES PATENTS

| | | | |
|---|---|---|---|
| 3,419,432 | 12/1968 | Hesson | 136—83 R |
| 3,449,165 | 6/1969 | Stott | 136—83 R |
| 3,245,836 | 4/1966 | Agruss | 136—83 R |
| 3,404,035 | 10/1968 | Kummer et al. | 136—6 |
| 3,463,670 | 8/1969 | Rao et al. | 136—83 R |
| 3,463,801 | 8/1969 | Papetti et al. | 260—448.2 R |
| 3,388,093 | 6/1968 | Heying et al. | 260—448.2 N |
| 3,388,090 | 6/1968 | Heying et al. | 260—448.2 N |
| 3,388,091 | 6/1968 | Heying et al. | 260—448.2 N |
| 3,388,092 | 6/1968 | Heying et al. | 260—448.2 N |

ANTHONY SKAPARS, Primary Examiner

U.S. Cl. X.R.

136—83 R, 133